United States Patent [19]

Mauran et al.

[11] Patent Number: 5,283,219
[45] Date of Patent: Feb. 1, 1994

[54] ACTIVE COMPOSITE AND ITS USE AS REACTION MEDIUM

[75] Inventors: Sylvain Mauran, Espira de l'Agly; Michel Lebrun; Philippe Prades, both of Perpignan; Michel Moreau, Clichy; Bernard Spinner, Corneilla del Vercol; Claude Drapier, Vaucresson, all of France

[73] Assignees: Societe Nationale Elf Aquitaine; Le Carbone Lorraine, both of France

[21] Appl. No.: 777,537

[22] PCT Filed: Apr. 11, 1991

[86] PCT No.: PCT/FR91/00303
    § 371 Date: Jan. 13, 1992
    § 102(e) Date: Jan. 13, 1992

[87] PCT Pub. No.: WO91/15292
    PCT Pub. Date: Oct. 17, 1991

[30] Foreign Application Priority Data

Apr. 11, 1990 [FR] France .................. 90 04660

[51] Int. Cl.$^5$ ............ B01J 20/20; B01J 8/02; C04B 35/54; F25B 17/08
[52] U.S. Cl. ................ 502/417; 165/905; 165/1; 252/378 R; 423/448; 502/406; 502/416
[58] Field of Search .......... 502/417, 416, 406, 181, 502/183; 252/378 R; 423/448; 165/905

[56] References Cited

U.S. PATENT DOCUMENTS

| | | | |
|---|---|---|---|
| 3,404,061 | 10/1968 | Shane et al. | 252/378 R |
| 4,432,408 | 2/1984 | Caines | 165/154 |
| 4,595,774 | 6/1986 | Coste et al. | 556/118 |

FOREIGN PATENT DOCUMENTS

| | | | |
|---|---|---|---|
| 0129473 | 12/1984 | European Pat. Off. | B01J 8/00 |
| 3129848A1 | 2/1983 | Fed. Rep. of Germany | B01D 53/26 |
| 3628096A1 | 5/1988 | Fed. Rep. of Germany | B01D 53/36 |
| 845760 | 9/1939 | France | 14/8 |
| WO89/07009 | 8/1989 | PCT Int'l Appl. | 502/417 |
| 1194766 | 6/1970 | United Kingdom | C01B 31/04 |

*Primary Examiner*—Paul E. Konopka
*Attorney, Agent, or Firm*—Bacon & Thomas

[57] ABSTRACT

An active composite consists of a compressed support and an agent which reacts with a gas. According to the invention, the compressed support comprises recompressed expanded graphite having a density between 0.02 and 1.5. A process for implementing gas-solid type reactions in which said active composite is used as the reaction medium is also described.

1 Claim, 1 Drawing Sheet

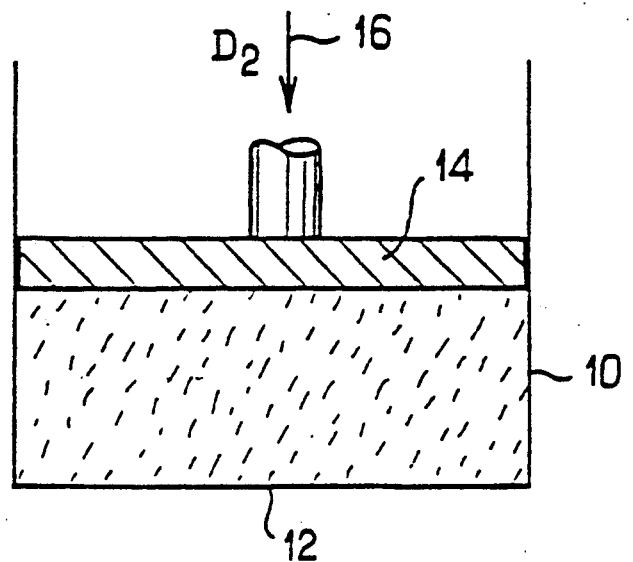
FIG._1
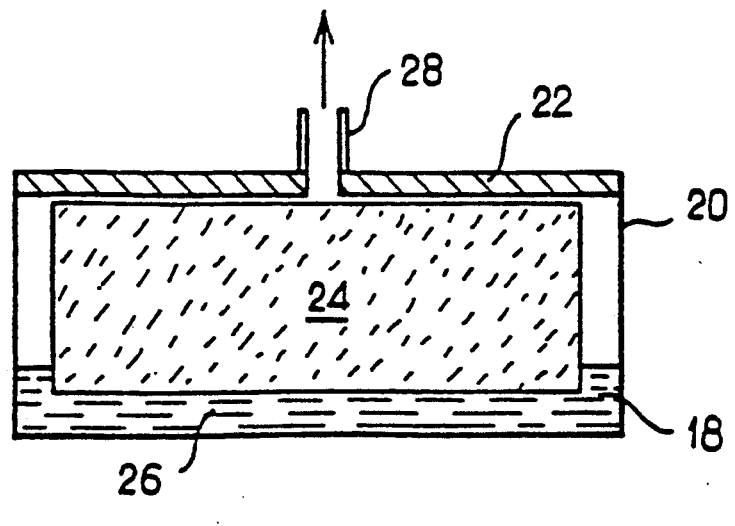
FIG._2

ACTIVE COMPOSITE AND ITS USE AS REACTION MEDIUM

The present invention relates to an active composite comprising a compressed support and an agent which is reactive towards a gas. The present invention also relates to a method for implementation of gas/solid or gas/liquid physicochemical processes using such an active composite as reaction medium In some sectors, such as, for example, that of chemical heat pumps based on the thermicity of the reaction between a solid and a gas, or of the adsorption of a gas on a solid, a mixture of a finely divided material, such as expanded graphite, and a solid reactant, for example a salt or an adsorbent such as a zeolite, is used. The mixture of expanded graphite and this solid, which is the seat of a chemical reaction or of a physical adsorption, has numerous advantages during a chemical reaction or a physical adsorption between the solid and a gas. The expanded graphite is in the form of platelets or platelet particles having a very large specific surface area and permits the diffusion of the gas even in a confined medium.

The substantial improvement observed in the kinetics of reversible solid/gas reactions, as resulting from the mixture of the active solid with natural graphite expanded by a thermal route, in the given proportions by mass and compacted in a fixed volume, results from an excellent permeability of the fixed bed prepared in this way to the reactive gas and in a thermal conductivity accompanied by a good heat exchange coefficient at the walls. Conventionally, the preparation of such a reagent leads to a homogeneous isotropic bed, the isotropic conductivity of which lies at values of 0.5 to 2 $Wm^{-1}K^{-1}$ depending on the conditions of preparation (proportion and compacting), and the exchange coefficient of which at the walls is between 50 and 150 $Wm^{-2}K^{-1}$.

Despite these advantages, the use of such mixtures in the granular state has drawbacks because of the difficulty in obtaining truly homogeneous mixtures, the difficulty in handling these and the large volume which they occupy. Moreover, the reactant, which is frequently hygroscopic, has a tendency to absorb moisture if the mixing operation is prolonged; a subsequent dehydration is lengthy and even costly and may influence the quality of the final product even after dehydration.

The aim of the present invention is, therefore, an active composite which is in the form of a block which can be handled easily and which, while preserving excellent permeability in one direction, has heat transfer properties in a preferred direction.

To this end, the invention proposes an active composite comprising a compressed support and an agent which is reactive towards a gas, characterised in that the compressed support comprises recompressed expanded graphite having a density of between 0.02 and 1.5. Unless stated otherwise, all values of density are expressed by conventional units ($g/cm^3$ or $g\ cm^{-3}$).

According to a preferred embodiment, the active composite contains from 1 to 95% by weight of recompressed expanded graphite and from 99 to 5% by weight of active agent.

The invention also provides a method for the implementation of solid/gas or solid/liquid [sic] physicochemical processes, characterised in that it uses, as reaction medium, an active composite comprising a compress support and an agent which is reactive towards a gas, the compressed support comprising recompressed expanded graphite having a density of between 0.02 and 1.5.

Such a block of active composite is intended to be used to carry out either a reaction of the solid/gas type, or an adsorption between a gas and a solid, or the absorption of a gas in a liquid, for example a saturated or unsaturated solution of a solid, or a reaction between a gas and a liquid catalysed by a solid, or the seat of a condensation/evaporation of a gas, or, finally, a gas conversion reaction catalysed by a solid. Thus, the present invention provides a method for carrying out either reactions of the gas/solid type, or gas/solid adsorption, or absorption of a gas in a liquid or, finally, catalytic conversion of a gas, using, as reaction medium, a block of active composite according to the invention.

The active composite according to the invention must have a very high heat transfer anisotropy which will result from the ordered compression of the graphite platelets, which are very good heat conductors, while preserving a high porosity enabling good diffusion of the gas to each active site which is arranged substantially uniformly in the composite.

The active composite according to the invention, the density of which is between 0.02 and 1.5, has a high thermal conductivity anisotropy, that is to say the thermal conductivity $C_1$ in a first direction $D_1$ of the active composite is distinctly higher than that obtained in another direction $D_2$ of the composite which is perpendicular to the first direction The active composite according to the invention has an anisotropy coefficient, which is the ratio $C_1/C_2$, of between 5 and 150 and preferably between 10 and 100.

Moreover, the active composite according to the invention must have a certain porosity enabling gases to reach the active sites.

The total porosity of the composite corresponds to the percentage void within the said composite, which is easily obtained from its measured density compared with the density of natural graphite:2.2.

The important characteristic of the composite is the open porosity representative of the accessibility of liquids and gases to the active sites. This open porosity is expressed as a percentage of the total porosity. It is determined by measuring the amount of water, kept under atmospheric pressure, absorbed by the block to which a pressure of 0.02 bar is applied, and the impact which this absorption has on the density of the composite.

The open porosity of the composite is generally between 32 and 99.1% of its total porosity. Within this range it will depend to a large extent on the density chosen for the composite in the application envisaged.

Other characteristics and advantages of the present invention will become more clearly apparent on reading the following description, which is given with reference to the appended drawings.

BRIEF DESCRIPTION OF THE DRAWINGS

FIG. 1 is a longitudinal section of an apparatus intended to compress a pulverulent material, and FIG. 2 is a longitudinal section of a device intended to impregnate a compressed pulverulent material in order to produce an active composite according to the invention.

As shown in FIG. 1, an apparatus intended to compress a pulverulent material in order to form a porous support comprises a cylinder 10 having a flat base 12. A piston 14, mounted so that it can slide in a leaktight manner in the cylinder 10, is arranged so as to be movable in the direction of the arrow 16.

The cylinder is precharged with an amount of pulverulent material to be compressed. In the present example, the material to be compressed is expanded graphite prepared by exfoliation and having an initial density of between 0.001 and 0.02, the expansion temperature generally being between 150° and 1200° C. The expanded graphite is compressed in the cylinder 10 by the piston 14 until a support or block of the desired density and cohesion is obtained. The expanded graphite block achieves such a cohesion when its density is higher than 0.02. The expanded graphite may advantageously be compressed so as to have a density of between 0.02 and 1.5.

In the example illustrated, the block of compressed expanded graphite is a cylinder, the base of which may have any shape, not necessarily circular; more generally, it is possible to obtain any desired shapes other than cylindrical, either by combining several compression directions or by machining the block which will have to have a sufficient cohesion.

As shown in FIG. 2, a device intended, for impregnating the block of compressed expanded graphite comprises a leaktight chamber 18 formed in a cylinder 20 closed by a leaktight cover 22. The dimensions of the chamber 18 are slightly larger than those of the block 24 to enable it to accommodate, on the one hand, the block 24 and, on the other hand, an amount of liquid product 26 intended to impregnate the block 24. If the active agent selected is a solid, this must then be introduced in a suitable chosen liquid, either by dissolving in a solvent or by very fine grinding and suspending, which operation then enables the liquid impregnating agent to be produced. The cover 22 has an opening 28 intended for connection to a vacuum source (not shown). The fall in pressure inside the unit 24 causes the liquid product 26 to penetrate into the interstices of the porous medium or into the interior of the accessible pores. The pressure applied at the opening 28 is in the range 0.01 to 0.1 bar and preferably 0.02 bar. For a block having a volume of 3 dm$^3$, the impregnation time is generally between a few seconds and 1 minute.

When the solvent used as impregnating agent is water it is, for example, quite sufficient to create a vacuum using a water pump.

When the active agent is a solid it is often advantageous to evaporate the intermediate liquid which has served to produce the impregnating agent, taking all precautions which enable the active agent to be left homogenously dispersed in the porosities of the support. Thus, if this liquid is water, the impregnated block 24 must be heated in an oven, the temperature of which is controlled to rise from 60° to 100° C. over a period of between 5 and 24 hours, this enabling the water to be evaporated from the solution. The oven is then brought to a temperature of at least 200° C. so as to remove the water of crystallisation, it being possible for the holding time of the block at this temperature to be between 1 h and 10 h.

This conditioning method can be used with numerous different active agents, such as those proposed by way of example in Table I. An active agent is understood to be, for example, a reactive solid, an adsorbent solid, an absorbent liquid or a solid acting as catalyst.

TABLE 1

| Nature of the active agent/gas interaction | Active agents | Gas |
|---|---|---|
| Solid/gas reactions (reversible) | halides | water |
| | pseudohalides | NH$_3$ and derivatives (amines) |
| | carbonates | |
| | sulphates | |
| | nitrates | |
| | oxides | CO$_2$ |
| | | SO$_2$ |
| | | SO$_3$ |
| | metals | O2 [sic] |
| | metal alloys | H$_2$ |
| | | hydrocarbons |
| | metal hydrides | H$_2$ |
| liquid/gas absorption (reversible) and saturated liquid/gas absorption (reversible) | aqueous solutions | water |
| | halides | |
| | pseudohalides | |
| | carbonates | |
| | sulphates | |
| | nitrates | |
| | solutions in liquid NH$_3$ | NH$_3$ and derivatives |
| | halides | |
| | pseudohalides | |
| | carbonates | |
| | sulphates | |
| | nitrates | |
| Solid/gas adsorption (reversible) | zeolite | water |
| | active charcoal | methanol and derivatives |
| | silica gel | |
| | phosphorus pentoxide | |
| heterogeneous catalysis | Ni + C$_6$H$_6$ | H$_2$ |

In the case of chlorides, Table II specifies the nature of impregnating liquids dissolving or suspending the active agent.

TABLE II

| | Impregnating liquid | |
|---|---|---|
| Active Agent | Dissolving | suspending |
| CaCl$_2$ | water or alcohol, acetone | |
| MnCl$_2$ | alcohol | ether, liquid NH$_3$ |
| BaCl$_2$ | alcohol | |
| NiCl$_2$ | alcohol, NH$_4$OH | liquid NH$_3$ |
| CuCl$_2$ | acetone | |
| CoCl$_2$ | alcohol, acetone ether | |
| SrCl$_2$ | alcohol, acetone | liqud NH$_3$ |
| NaCl | glycerol | |
| FeCl$_2$ | alcohol, acetone | ether |
| NH$_4$Cl | alcohol, liquid NH$_3$ | acetone, ether |
| CdCl$_2$ | alcohol | acetone, ether |

EXAMPLES 1 to 4

The characteristics of active composites according to the invention will now be studied:

Example 1

Active composite comprising 25% of graphite, 75% of CaCl$_2$. After compression of the expanded graphite on its own, a block having a mass per unit volume of 0.2 g cm$^{-3}$ was obtained Impregnation with a CaCl$_2$ solution was carried out under vacuum; the block was then dried at 240° C. in order to remove the impregnating agent. The radial conductivity (that is to say in the direction perpendicular to the compression direction) of the block of active composite is 7 Wm$^{-1}$ K$^{-1}$ whereas its axial conductivity (that is to say in the direction parallel to the compression direction) is less than 1 $Wm^{-1} K^{-1}$. The reactivity of this material towards methylamine was compared with that of an isotropic mixture of $CaCl_2$ with expanded graphite prepared in the same proportions, and for the same thermodynamic conditions. The average thermal power for 90% of the reaction, exchanged between the system and the heat transfer fluid, per unit volume of the active composite, is 440 kW $m^{-3}$ in the case of the impregnated compressed material, whereas it is 180 kW $m^{-3}$ in the case of the simple physical mixture. The open porosity is 55% of the total porosity of the composite.

Example 2

An active composite comprising 50% of graphite, 50% of $CaCl_2$ is prepared from a block having a mass per unit volume of 0.2 g $cm^{-3}$.

The radial conductivity of the block of active composite is 18 $Wm^{-1} K^{-1}$ and the contact coefficient is 860 $Wm^{-2} K^{-1}$.

Under the same conditions as above, the specific outputs are, respectively, 770 kW $m^{-3}$ and 240 kW $m^{-3}$. The open porosity is 50% of the total porosity of the composite.

Example 3

Active composite containing 40% of graphite and 60% of $MnCl_2$. Under the same conditions as above, starting from a block having a mass per unit volume of 0.26 $g/cm^3$ reacting with ammonia, the specific outputs are, respectively, 640 kW $m^{-3}$ and 230 kW $m^{-3}$. The open porosity is 52% of the total porosity of the composite.

Example 4

Active composite comprising 72% of graphite and 28% of $CaCl_2$. The radial conductivity is 24 Wm $K^{-1}$. Under the same conditions as the preceding examples, for an active composite prepared from a graphite block having a mass per unit volume of 0.3 g $cm^{-2}$ [sic], the specific outputs are, respectively, 960 kW $m^{-3}$ and 260 kW $m^{-3}$. The open porosity is 48% of the total porosity of the composite.

As the examples show, the active composite according to the invention has a density of between 0.02 and 1.5 and has a significant anisotropy, the conductivity in a first direction $D_1$ being higher than that in a second direction $D_2$ perpendicular to the first. The platelet particles of expanded graphite, the planes of which which [sic] have a very good thermal conductivity ($<20$ $W.m^{-1} K^{-1}$), are initially in all spacial directions and order themselves in a single direction under the action of the compression. The active composite has an anisotropy coefficient defined by the ratio of the conductivities $C_1/C_2$ which is 5 to 150 and preferably between 10 and 150.

The active composite according to the invention may comprise from 1 to 95% by weight of recompressed expanded graphite and from 5 to 99% by weight of active agent. Its contact coefficient is between 500 and 5000 $Wm^{-2} K^{-1}$.

The recompressed expanded graphite has a density of between 0.02 and 1.5 and the open porosity accessible to liquids or to gases is between 99.1% and 32% of the total porosity of the composite.

The active composite according to the invention may constitute the reaction medium for a method for carrying out chemical reactions of the gas/solid type. By way of example, the gas is methylamine and the solid $CaCl_2$. In this case, the solid/gas reaction is as follows:

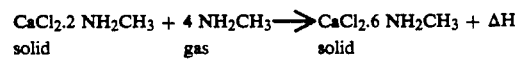

$CaCl_2.2$ $NH_2CH_3$ + 4 $NH_2CH_3 \longrightarrow CaCl_2.6$ $NH_2CH_3$ + $\Delta H$
solid                       gas                   solid Other reactions are possible between the salts of Table II either with methylamine or with ammonia.

The active composite according to the invention may be used in any method for carrying out physicochemical processes using a gas and either a reactive solid, or an absorbent solid, or a saturated or unsaturated absorbent liquid, or a solid acting as catalyst, or, finally, the seat of a gas condensation/evaporation.

We claim:

1. In an improved active composite for use in a gas-solid reaction heat pump; said active composite comprising an active agent reactive toward said gas so that said agent and said gas are capable of interacting for the operation of said heat pump; said agent being dispersed in a graphite support media; wherein the improvement comprises:

said graphite support is expanded graphite which has been compressed to a density of 0.02 $g/cm^3$ to 1.5 $g/cm^3$;

said active composite comprises from 1% to 95% by weight of said graphite and from 99% to 5% by weight of said active agent;

said active composite has a thermal conductivity anisotrophy coefficient $C_1/C_2$ between 5-150 wherein $C_1$ represents the thermal conductivity in a first direction and $C_2$ represents the thermal conductivity in a second direction which is perpendicular to said first direction; and said active composite has an open porosity which is 32% to 99.1% of the total porosity of the composite, said open porosity being a value determined by measuring the amount of water, kept under atmospheric pressure, absorbed by a block of said composite to which a pressure of 0.02 bar is applied.

* * * * *